Dec. 30, 1952   B. GROSS   2,623,972
SPOT WELDING MACHINE
Filed Oct. 6, 1951   3 Sheets-Sheet 1

BERNARD GROSS
INVENTOR.

BY S. Tierny Jr.
ATTORNEY

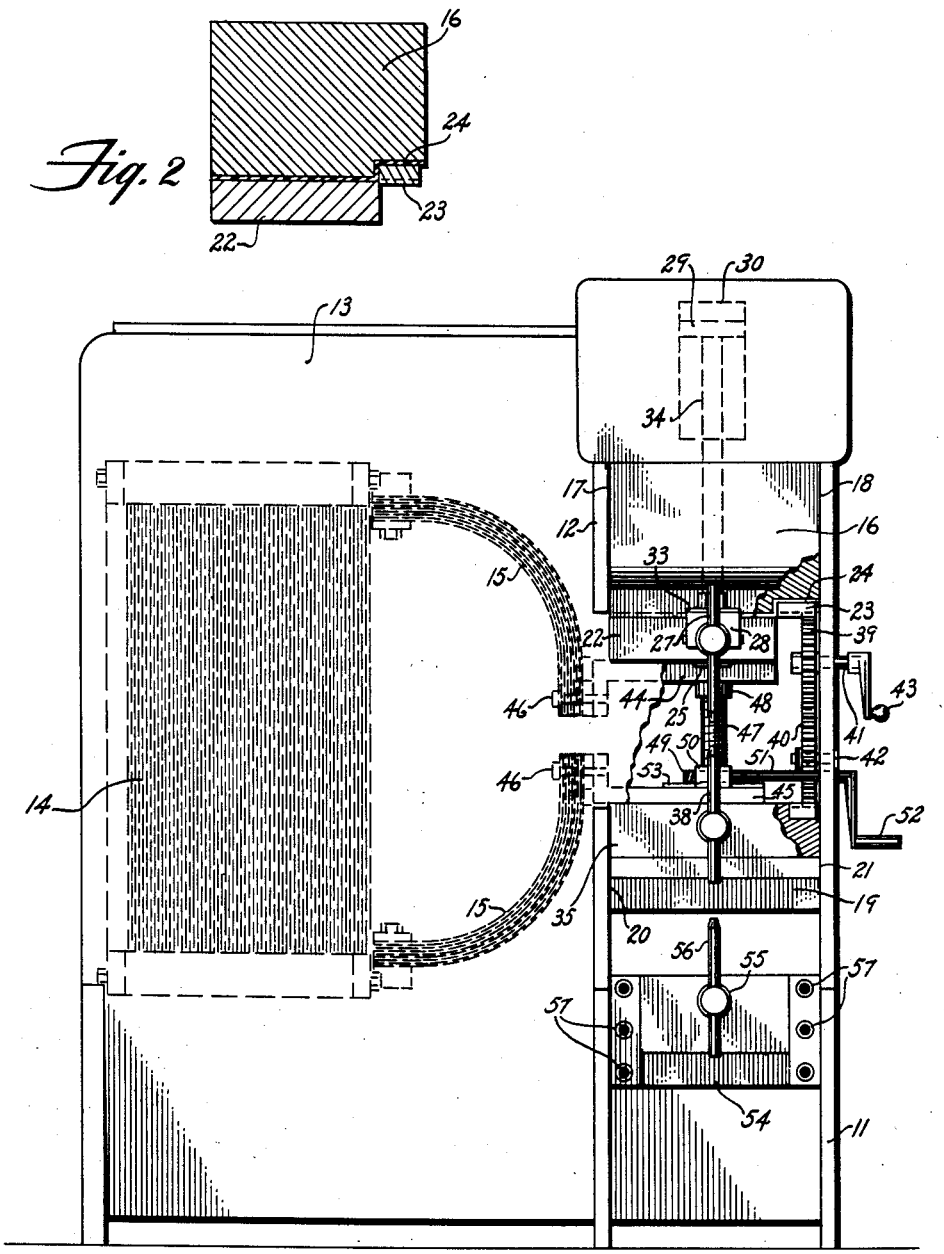

Dec. 30, 1952  B. GROSS  2,623,972
SPOT WELDING MACHINE
Filed Oct. 6, 1951  3 Sheets-Sheet 3

BERNARD GROSS
INVENTOR.

BY S. Tierney Jr
ATTORNEY

Patented Dec. 30, 1952

2,623,972

UNITED STATES PATENT OFFICE 2,623,972

SPOT WELDING MACHINE

Bernard Gross, San Diego, Calif., assignor to Rohr Aircraft Corporation, Chula Vista, Calif., a corporation of California Application October 6, 1951, Serial No. 250,100

6 Claims. (Cl. 219—4)

This invention relates to a resistance type electric welding machine for spot welding parts of a workpiece together.

In the usual spot welding machine, the welding electrodes are secured to horns or electrode holders which are clamped in suitable clamps in which the electrode holders are adjustable to bring the electrodes into alignment or to change the distance from the electrodes to the framework of the machine in order to accommodate workpieces of different lengths. This procedure necessitates loosening bolts which open the clamps, manually moving the electrode holders or horns longitudinally of the clamps and retightening the bolts, a process which necessitates the use of tools and requires considerable time. Also, if in making the adjustment, one of the horns is rotated slightly in its clamp, the electrodes will not align properly after the distance setting has been made so that further time is spent in re-aligning the electrodes. It is a main purpose of the present invention to provide means whereby the operator may easily and quickly set the welding electrodes at any desired distance from the frame of the machine without their getting out of alignment.

A further object of the invention is to provide gearing means capable of selective operation at the will of the operator whereby the welding electrodes may be adjusted simultaneously or one at a time.

Another object of the invention is to provide a third welding electrode located near the base of the machine which is capable of cooperating with the top electrode to weld workpieces whose shapes will not permit their entry between the movable top electrodes, means being provided to take the middle electrode and its horn out of the way when welding is done by the top and third electrodes.

Further objects will become apparent as the description of the machine proceeds. For a better understanding of the invention, reference is made to the accompanying drawings, in which:

Figure 2 is a section through line 2—2 of Figure 1 showing an electrode support, Figure 3 is an end view of the machine of Figure 1.

Figure 1:
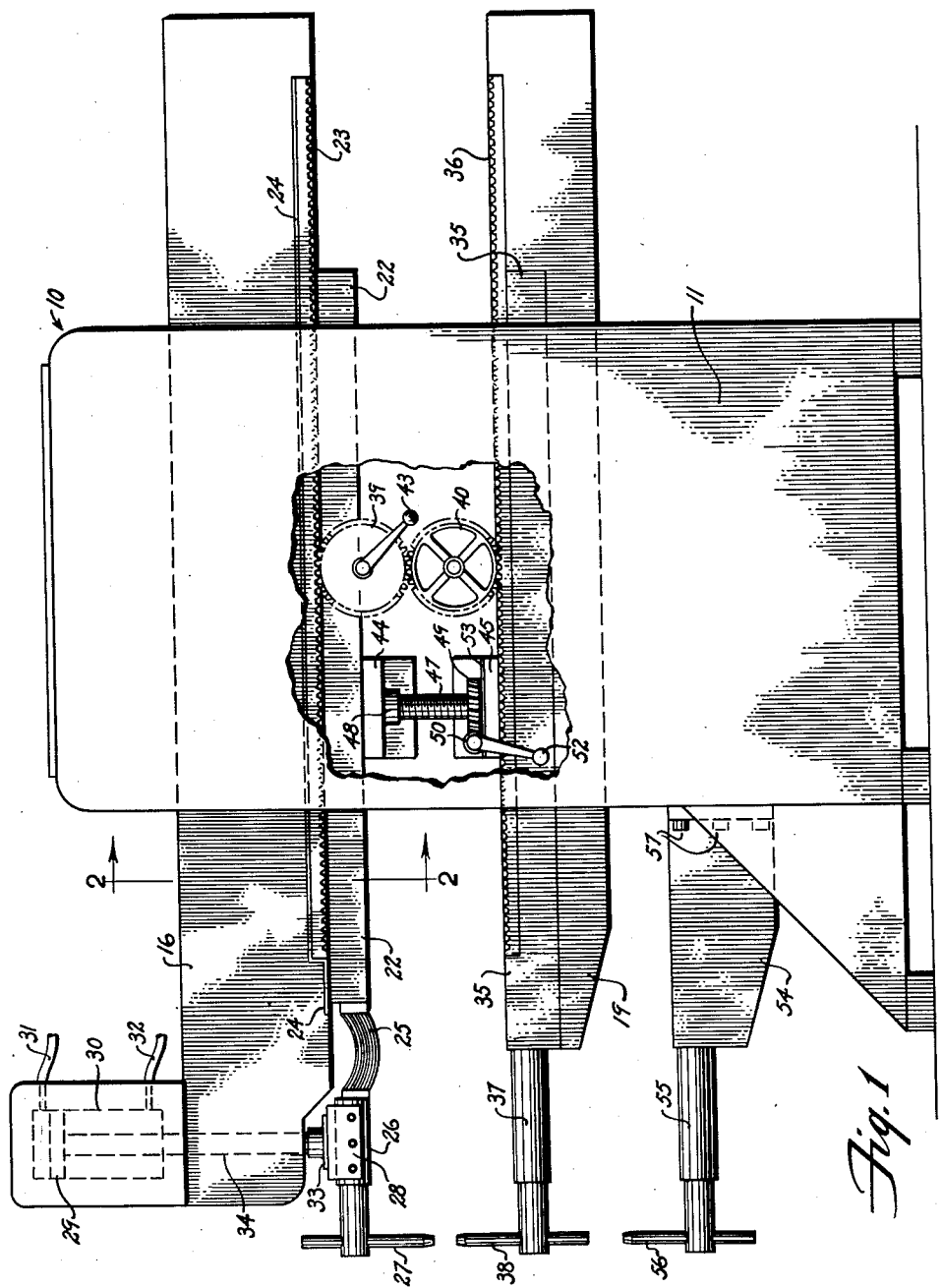
Figure 1 is a front view, partly diagrammatic and with a portion of the front of the machine removed, of a welding machine embodying the invention.

The welding machine shown comprises a main supporting frame 10 comprising parallel front and rear walls 11, 12 and at the rear of wall 12 an extension 13 in which a current supply transformer 14 is mounted, the secondary winding of which terminates in a pair of heavy copper flexible bus bars 15. Alternating current of commercial voltage and frequency is supplied to the primary of the transformer through the usual control switches (not shown) which start and stop the current at the proper times during the welding cycle. An upper electrode actuating and supporting member 16 is mounted in a pair of straight guideways 17, 18 formed in plates 11, 12 and a lower electrode supporting member 19 is supported for reciprocation in a lower pair of guideways 20, 21 in plates 11, 12. Secured to member 16 is a long copper bar 22 having a wide set of rack teeth 23, a liner 24 formed of insulation material serving to electrically insulate bar 22 from member 16 and frame 10. The left hand end of bar 22 is connected by heavy flexible copper bus bars 25 with a copper electrode support 26 whose end is cylindrical as shown and carries upper welding electrode 27. Support 26 has an insulating jacket 28 and is reciprocated by a piston 29 operable within cylinder 30 to the ends of which fluid under pressure is supplied by two conduits 31, 32. The pressure is distributed over jacket 28 by an enlarged flange 33 secured to the bottom of piston rod 34.

Electrode support 19 is provided with wide copper bar 35 which has rack teeth 36 and at its end is cylindrical to provide a horn 37 which carries lower welding electrode 38. Electrodes 27 and 38 are preferably made of copper and are cylindrical in shape with tapering ends, as shown. Racks 23 and 36 are driven by a pair of meshing spur gears 39 and 40 which are mounted on a pair of shafts 41, 42 journaled in wall 11. Upper shaft 41 is slidable in its bearing and is shown rotated by a handle 43, although an electric motor drive (not shown) may be used instead. It will be clear that with gears 39 and 40 meshing and handle 43 in its forward position, as shown in the drawing, rotation of the handle causes both the racks 23 and 36 to be driven in the same direction and by the same amount, thus causing the spacing between welding electrodes 27, 38 and frame 10 to be varied at will. When the machine is first assembled or after making repairs to it, it may be found that welding electrode 27 is not in alignment with electrode 38. By pushing handle 43 rearwardly, the operator may disengage gear 39 from gear 40 so that when he rotates handle 39, only the rack 23 is driven to move electrode 27 into alignment with electrode 38. Frame 10 and electrode supports 16 and 19 are preferably made of strong steel as is also gear 40 while gear 39 is made of suitable insulation material such as Micarta.

A path of low electrical resistance is established between bus bars 15 and copper bars 22 and 35 by means of large copper contact plates 44, 45 which engage the under flat face of bar 22 and the top face of bar 35 respectively. Bolts 46 connect the ends of bus bars 15 to the plates 44, 45. After the gearing has been operated to secure the desired spacing between electrodes 27, 38 and frame 10, plates 44, 45 are pressed apart and into firm contact with bars 22 and 35 by gearing which comprises a rotatable screw 47 which is threaded into a boss 48 on plate 44. Screw 47 is rotated by a worm gear 49 driven by a meshing worm 50 on a shaft 51 journaled in plate 11 and having an operating handle 52. A plate 53 of suitable insulation material is interposed under worm gear 49 in order to prevent the direct flow of current from contact plate 44 to plate 45.

The guideways for electrode supports 16 and 19 extend clear across frame 10 and distribute the stresses incident to the welding over such large areas that no deflection of the frame ensues such as would throw welding electrodes 27 and 38 out of alignment and result in defective welds. This distribution of the stress across the entire width of the frame permits the frame to be made of lighter material than would be possible if the pressure due to welding were all concentrated at a very limited portion of the frame.

For welding workpieces of certain shapes, the supporting means for electrode 38 may be in the way and prevent the insertion of the workpiece between the electrodes. Such pieces may be welded by providing an auxiliary steel electrode support 54 which carries the cylindrical copper horn 55 which in turn supports welding electrode 56. Support 54 is anchored in position on frame 10 by a plurality of bolts 57 thus establishing a good ground connection between electrode 56 and frame 10.

When desirous of welding with electrodes 27 and 56, handle 52 is first rotated to take the pressure off contact plates 44, 45. Handle 43 is then rotated to move electrodes 27 and 38 to the right in Figure 1 until horn 37 is out of the way of the workpiece. Handle 43 is then pushed rearwardly to disengage gear 39 from gear 40 and then rotated to move rack 23 and advance electrode 27 until it is in alignment with electrode 56. Handle 52 is then rotated to press contact plates 44 and 45 into good electrical contact with copper bars 22 and 35 respectively whereupon the machine is ready for welding.

Figure 4:
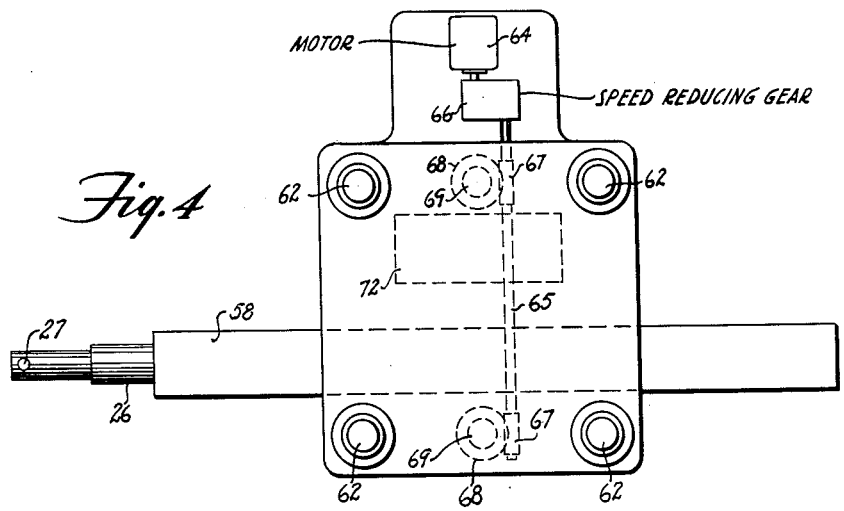
Figure 4 is a top view, partially diagrammatic, of a welding machine showing a modified form of the invention.
Figure 5:
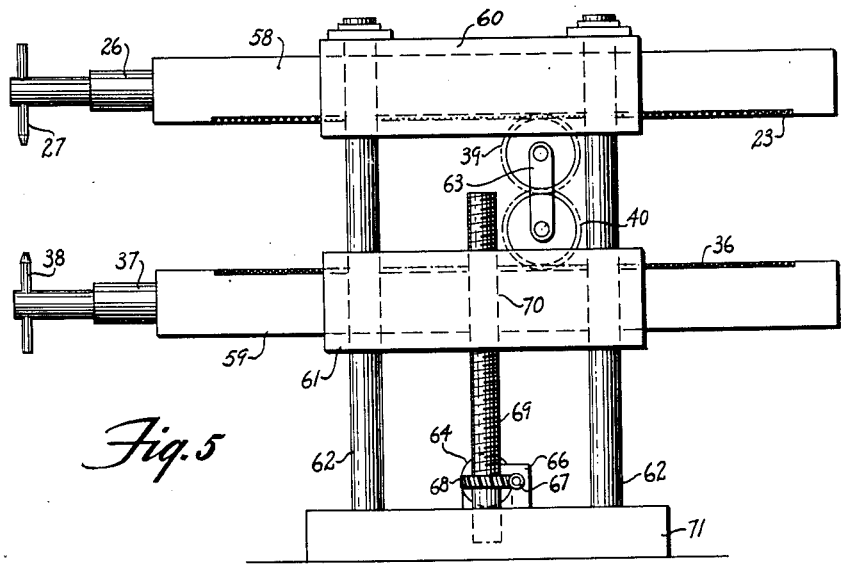
Figure 5 is a front view of the machine of Figure 4 and, Figure 6 shows a detail of Figure 5.
Figure 6:
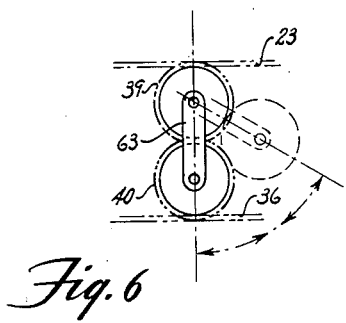

In the modification shown in Figures 4, 5 and 6, the frame which supports the electrode supporting members 58, 59 is made in upper and lower portions 60, 61; frame portion 60 being secured at the top of four cylindrical columns 62. The same means as that above described may be used to insulate electrode support 58 from its supporting frame. The rack and gear drive means for varying the distance between welding electrodes 27, 38 and the frame is the same as that above described except that drive gears 39, 40 are pivotally supported on a link structure 63 which may be tilted to accommodate different spacings between racks 23 and 36 and also to permit lower gear 40 to be moved out of contact with its rack 36 before raising the latter and frame 61. Any suitable means, not shown, may be provided for tilting link structure 63 about its axis. Frame 61 is raised or lowered by a reversible electric motor 64 which drives a shaft 65 through speed-reducing gearing 66. Shaft 65 carries two worms 67 which drive a pair of worm gears 68 attached to a pair of vertical threaded shafts 69 which pass through a pair of correspondingly threaded holes 70 in frame 61. Columns 62 are set in a main supporting base 71 on which motor 64 and the casing enclosing gearing 66 are also mounted. The position of the transformer is indicated at 72, and the ends of its secondary winding being connected to electrode supports 58, 59 by any known means (not shown).

To set welding electrode 38 closer to electrode 27, link 63 is first tilted to raise gear 40 clear of rack 36. Motor 64 is then started in a direction to raise frame 61 until the desired electrode spacing is secured whereupon link 63 is then lowered to bring gear 40 into engagement with rack 36. To now increase the distance between the electrodes 27, 38 and the frame, gears 39 and 40 are simultaneously rotated in the manner above described in connection with Figures 1 to 3.

To effect the welding, horn 26 is raised and lowered by a piston in the manner above described or may be operated by a rotating cam in a manner known in the art. This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A spot welding machine comprising, in combination: a supporting frame; a pair of electrode holders of high electrical conductance supported by said frame for reciprocation in straight parallel paths; a pair of welding electrodes connected to said electrode holders and adapted to be moved into alignment with each other by said electrode holders; a manual control member supported for adjustment into either of two positions; and gearing controlled by said manual control member arranged, in one position of said manual control member, to actuate both of said electrode holders simultaneously to change the distance of the welding electrodes from the frame and, in a second position of said manual control member, to actuate only one of said electrode holders and thereby change the distance between said welding electrodes.

2. A welding machine as claimed in claim 1; in which said gearing comprises a spur gear supported for rotation and for movement into different planes by said manual control member.

3. A spot welding machine comprising, in combination: a supporting frame; upper and lower electrode holders of high electrical conductance supported by said frame; upper and lower aligned welding electrodes connected to said electrode holders; a third electrode holder of high electrical conductance supported by said frame between said electrode holders; a third welding electrode supported by the third electrode holder in alignment with the upper welding electrode whereby a workpiece engaged by the third and upper welding electrodes may be welded by welding current passing through said third and upper electrodes; and gearing connected to said third electrode holder to advance said holder and third welding electrode towards the frame by a distance sufficient to permit a workpiece to be inserted between the upper and lower welding electrodes for welding by current passing through said upper and lower welding electrodes.

4. A spot welding machine comprising in combination: a supporting frame having spaced apart rigid members provided with upper and lower horizontal parallel guideways; a pair of supports disposed within said frame and slidable along said guideways; an electrode holder of high electrical conductance connected to said upper support; a first welding electrode depending from said electrode holder; a second electrode holder of high electrical conductance connected to said lower support; a welding electrode projecting up from said second electrode holder and in alignment with said first welding electrode; gearing including meshing gears supported by said frame between said supports and arranged to simultaneously move said supports along said guideways by the same amount to increase the spacing between said welding electrodes and the frame while maintaining said electrodes in alignment with each other; and a single drive member arranged to rotate said gears.

5. A welding machine comprising, in combination: a supporting base; a pair of spaced apart cylindrical columns secured to said base adjacent the front thereof; a second pair of spaced apart vertical columns secured to said base adjacent the rear thereof; an upper frame attached to said pairs of columns at the top thereof; an electrode support mounted for sliding movement horizontally along said upper frame; a first welding electrode depending from said electrode support; a lower frame provided with four openings through which said pairs of columns pass for sliding movement of said lower frame along said columns; a second electrode support mounted for sliding movement horizontally along said lower frame; a welding electrode projecting up from said second electrode support in alignment with said first welding electrode; gearing supported on said base arranged to raise or lower said lower frame along said columns to provide a desired spacing between the adjacent ends of said welding electrodes; and gearing disposed between said upper and lower frames arranged to simultaneously move said electrode supports to change the spacing between said welding electrodes and said upper and lower frames.

6. A welding machine as claimed in claim 5; in which the gearing disposed between the frames has a member capable of being shifted out of driving engagement with one of the electrode supports.

BERNARD GROSS.

REFERENCES CITED

The following references are of record in the file of this patent:

UNITED STATES PATENTS

| Number | Name | Date |
|---|---|---|
| 1,174,446 | Rietzel | Mar. 7, 1916 |
| 1,586,585 | Stanley | June 1, 1926 |
| 2,161,430 | Potchen | June 6, 1939 |
| 2,357,038 | Whitesell | Aug. 29, 1944 |